United States Patent
Watkins

[11] Patent Number: 5,996,168
[45] Date of Patent: Dec. 7, 1999

[54] WINDSHIELD CLEANING SYSTEM INCLUDING SCRAPER UNIT

[76] Inventor: Timothy Joseph Watkins, P.O. Box 11281, Glendale, Ariz. 85318

[21] Appl. No.: 09/097,060

[22] Filed: Jun. 12, 1998

[51] Int. Cl.[6] ................ B60S 1/28; B60S 1/46
[52] U.S. Cl. .................. 15/250.4; 15/250.02
[58] Field of Search ............ 15/250.4, 250.41, 15/250.19, 205.04, 205.02

[56] References Cited

U.S. PATENT DOCUMENTS

| | | | |
|---|---|---|---|
| 3,631,561 | 1/1972 | Aszkenas | 15/250.41 |
| 4,016,623 | 4/1977 | Nixdorf | 15/250.4 |
| 4,019,216 | 4/1977 | Priesemuth | 15/250.4 |
| 4,719,661 | 1/1988 | Hanselmann | 15/250.4 |
| 5,168,595 | 12/1992 | Naylor, Jr. | 15/250.4 |
| 5,290,363 | 3/1994 | Kim | 15/250.22 |
| 5,301,384 | 4/1994 | Perry | 15/250.4 |
| 5,327,615 | 7/1994 | Green | 15/250.41 |
| 5,442,834 | 8/1995 | Perry | 15/250.4 |
| 5,799,359 | 9/1998 | Dockery et al. | 15/250.4 |

FOREIGN PATENT DOCUMENTS 8001155  6/1980  WIPO ................ 15/240.4

*Primary Examiner*—Gary K. Graham

[57] ABSTRACT

A casing attached to or made part of a standard windshield wiper assembly that extends a scraper blade to the surface of a vehicle windshield to dislodge insect remains and debris, with the aid of the wiper motion and a vehicle mist system. Once the desired cleaning effect is accomplished, the scraper is then retracted into the casing to allow normal operation of the vehicle's windshield wipers.

1 Claim, 3 Drawing Sheets

WINDSHIELD CLEANING SYSTEM INCLUDING SCRAPER UNIT

BACKGROUND—FIELD OF INVENTION

The present invention relates to the cleaning of windshields, specifically to such that are on automobiles, trucks, buses and trains.

BACKGROUND—DESCRIPTION OF PRIOR ART

The use of windshield cleaning assemblies is known prior art. More specifically, windshield cleaning assemblies devised for cleaning and clearing windshields previously utilized are known to consist basically of familiar, expected and obvious structural configurations, not withstanding the myriad of designs encompassed by crowded prior art which have been developed for the fulfillment of countless objectives and requirements.

The present invention is directed toward improving devices for cleaning vehicle windshields in a manner which is safe, secure, economical, and aesthetically pleasing.

For example, U.S. Pat. No. 5,290,363 to Kim discloses a method for wiping and cleaning a windshield with a pair of circular windshield portions, rotating against a brush containing moisture.

None of the prior art, nor the invention above, provide an adequate means to allow a vehicle operator to continue to drive and clean insect remains or similar debris from a windshield, nor to stop the smearing effects caused by insects.

In this respect, the Windshield Cleaning System according to the present invention substantially decreases the conventional concepts and designs of the prior inventions, and in so doing provides an apparatus primarily developed for the purpose of cleaning windshields; more specifically, dislodging insect remains or similar debris while continuing to operate an automobile, truck, bus, or train.

The present invention achieves its intended objects, and advantages through a new, useful, unobvious combination of methods, steps, and components with the use of a minimum number of functional parts and a reasonable cost to manufacture with readily available materials.

OBJECTS AND ADVANTAGES

Accordingly, besides the objects and advantages of the invention's process to clean and clear vehicle windshields described in the present invention, several additional objects and advantages of my invention are:

a) increased visibility and safety while operating a vehicle, b) variability; the invention can be offered as either an after market accessory or installed by vehicle manufacturers, c) removability during the winter months when insects are dormant and to reduce ice build up, d) can utilize optional sources for activating the system, compressed air, hydraulic, electrical, or a mechanical process, etc., e) varied sizes; this invention can be made in different sizes to accommodate the lengths of various windshield wiper assemblies.

Still yet another object of the present invention is to:

a) provide a new windshield cleaning system which may be easily and efficiently manufactured.

b) provide a new windshield cleaning system that may be universally applied to a wide variety of different automobiles, thereby precluding the need to manufacture or inventory a large number of different cleaning systems.

c) provide a windshield cleaning system that increases the driver's safety, the driving public, and pedestrians.

d) provide a windshield cleaning system that allows a driver to avoid frequent stops to clean insect remains from the windshield.

e) provide a windshield cleaning system that is durable and aesthetically pleasing.

The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure.

Therefore, it can be appreciated that there exists a continuing need for a windshield cleaning system. In this, the present invention substantially fills this need.

As illustrated by the background art, efforts are obviously being made in an attempt to develop devices for cleaning windshields. No prior effort, however, provides the benefits apparent with the present invention. Additionally, the prior art and commercial techniques do not suggest the inventive combination of component elements and features configured as disclosed and claimed herein.

Still further objects and advantages will become apparent from a consideration of ensuing description and drawings.

DRAWING FIGURES

REFERENCE NUMERALS IN DRAWINGS

| | |
|---|---|
| 10A | Decorative cover |
| 10B | Decorative cover |
| 11A | Push type solenoid |
| 11B | Push type solenoid |
| 12 | Casing |
| 14 | Wire opening |
| 16A | Female adapter |
| 16B | Female adapter |
| 17A | Male adapter |
| 17B | Male adapter |
| 18A | Fastener |
| 18B | Fastener |
| 20 | Standard rubber blade |
| 22 | Standard wiper arm |
| 24A | Attachment piece |
| 24B | Attachment piece |
| 26A | Female clip receiver |
| 26B | Female clip receiver |
| 26C | Female clip receiver |
| 28A | Fastener hole |
| 28B | Fastener hole |
| 29A | Wedge strip |
| 29B | Wedge strip |
| 30A | Fastener |

-continued

| | |
|---|---|
| 30B | Fastener |
| 31A | Wedge plate guide |
| 31B | Wedge plate guide |
| 31C | Wedge plate guide |
| 31D | Wedge plate guide |
| 32A | Male clip |
| 32B | Male clip |
| 32C | Male clip |
| 33 | Repair panel |
| 34A | Push rod |
| 34B | Push rod |
| 36A | Wedge plate |
| 36B | Wedge plate |
| 38A | Angle adjuster |
| 38B | Angle adjuster |
| 40 | Insert blade |
| 42 | Rubber strip |
| 44 | Buffer strip |
| 46 | Coarse scraper |
| 48 | Fine scraper |
| 50A | Mounting plate |
| 50B | Mounting plate |

Summary

In accordance with the present invention, a scraper assembly comprises a casing that is attached to, or made as part of, a standard windshield wiper assembly; that houses a non-scoring scraper blade that can be extended or retracted to clean insect remains and debris from an automobile, truck, bus, or train windshield with the aid of the vehicle's misting system and the motion of its windshield wiper arms.

These, together with other objects of the invention, along with the various features of novelty which characterize the invention, are pointed out with particularity in the claims annexed to and forming part of this disclosure. For a better understanding of the invention, its operating advantages and the specific objects attained by its uses, reference should be made to the accompanying drawings and descriptive matter in which there are illustrated embodiments of the invention.

Description FIGS. 1 to 4

Figure 1:
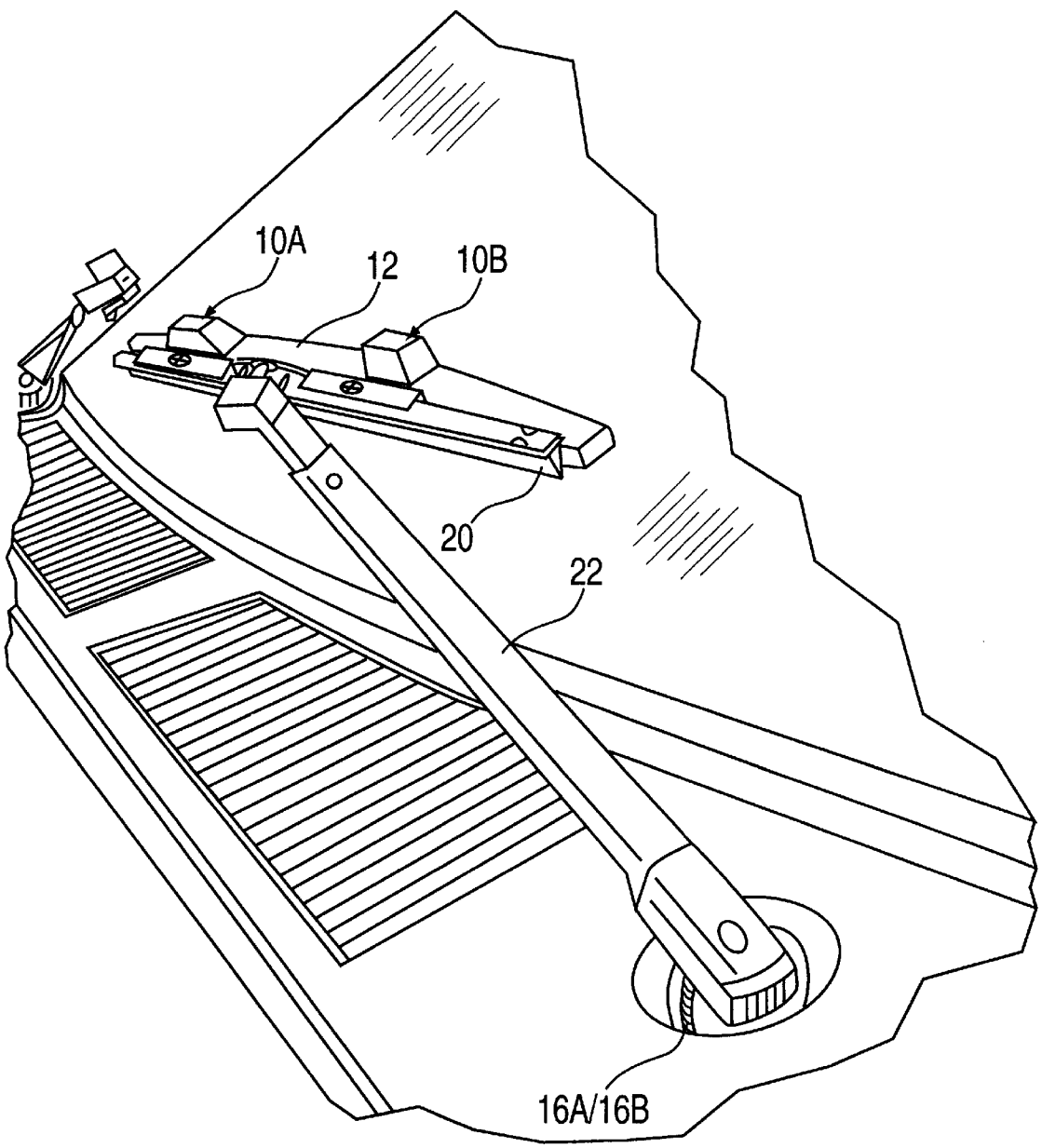
FIG. 1 is a perspective view of a first embodiment of the present invention illustrating its manner of use.
Figure 2:
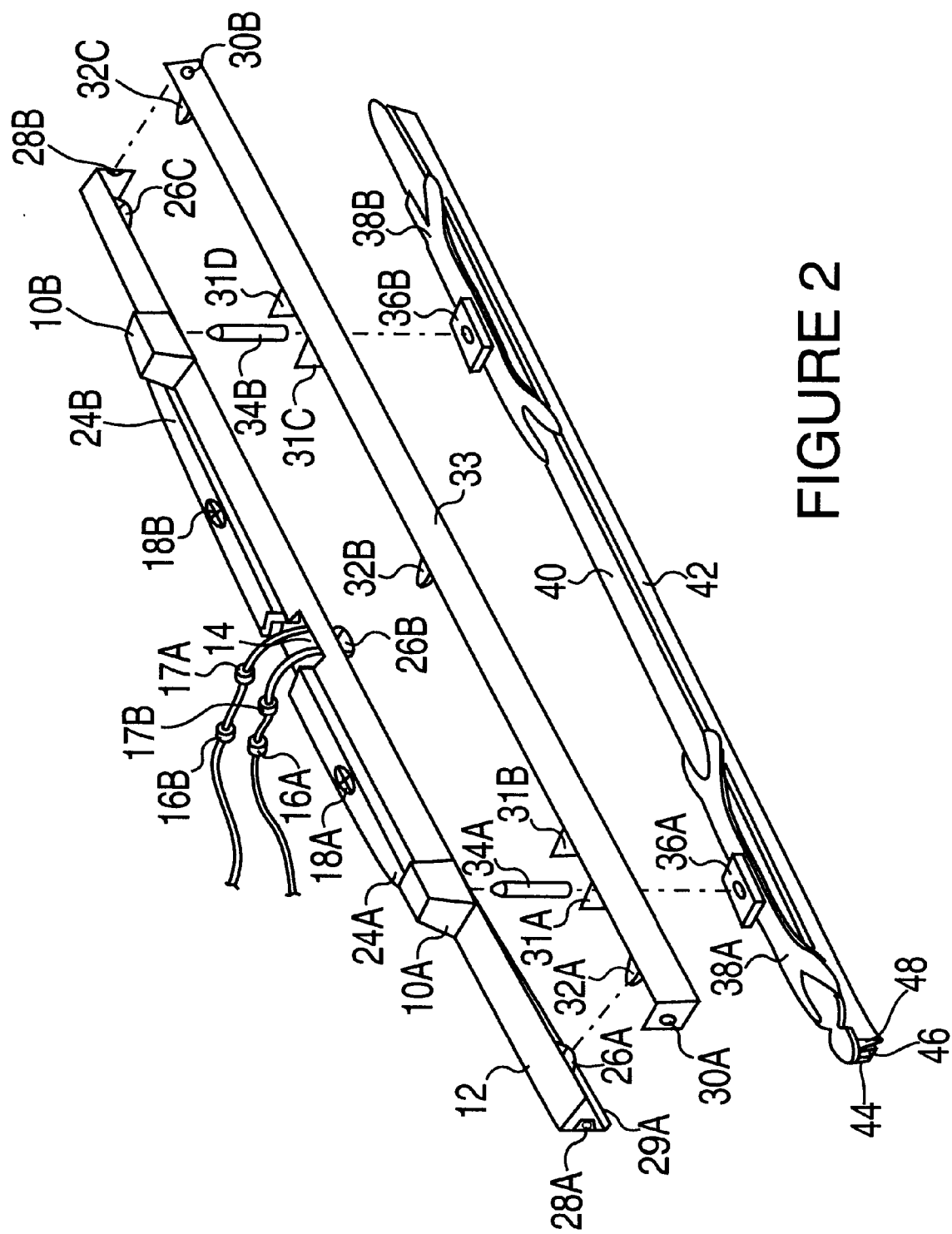
FIG. 2 is an exploded view of the invention illustrating its manner of construction.
Figure 3:
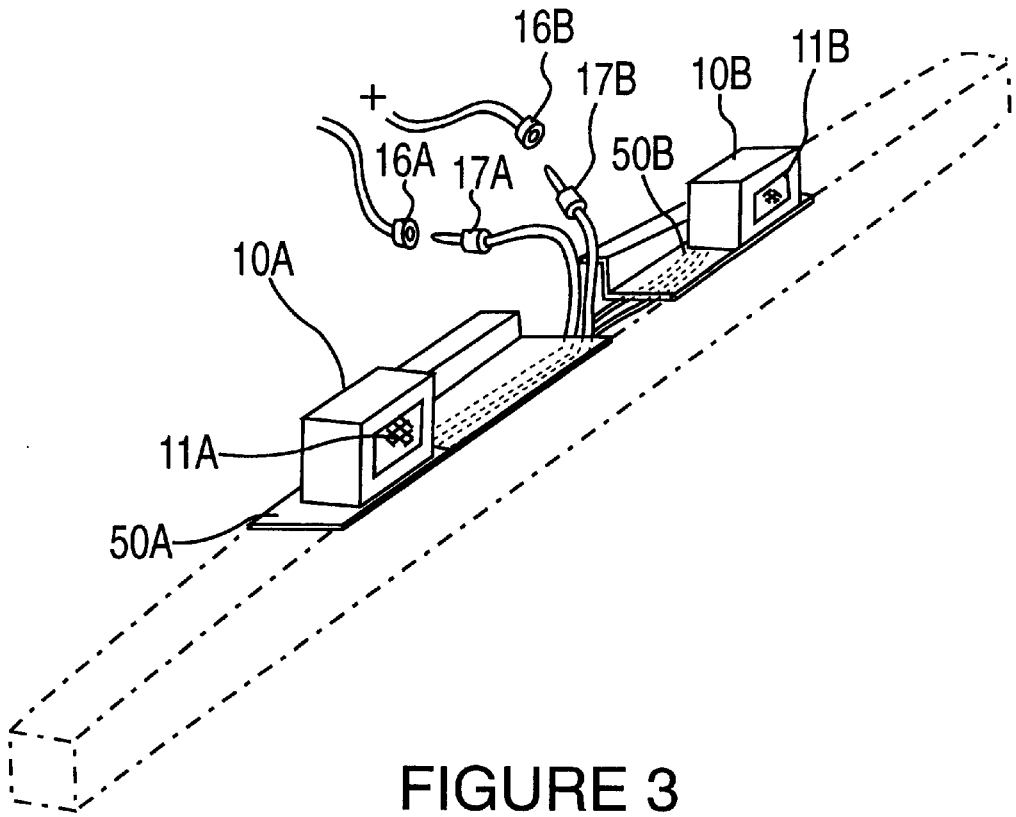
FIG. 3 is a sectional view illustrating the solenoids, wiring, and connections.
Figure 4:
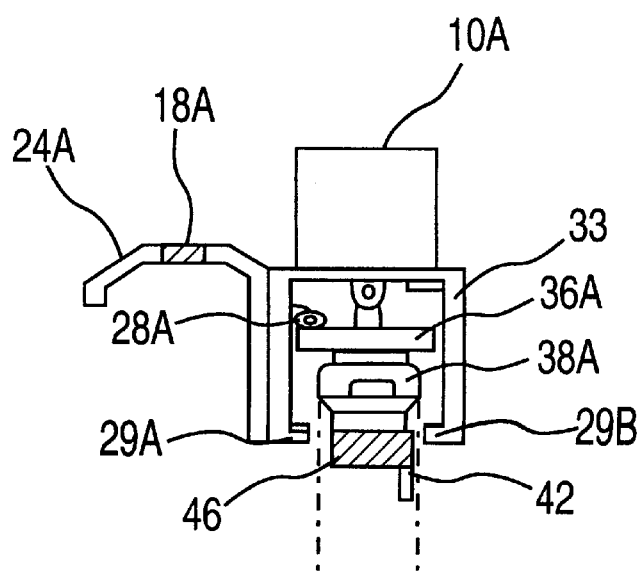
FIG. 4 is a sectional view of the invention illustrating its manner of movement.

A typical embodiment of the scraper assembly is illustrated in FIG. 1. The scraper assembly has a casing (12) preferably made of fiberglass, plastic, or other suitable materials. The casing attaches to the top side of a windshield wiper assembly by a front attachment piece (24A), rear attachment piece (24B) and secured by two screws (18A) (18B) or fasteners (not pictured).

On one side of the casing (12) is a repair panel (33), that attaches to the casing by inserting screws through (30A) (30B) into opening in the casing (28A)(28B), by male clips (32A)(32B)(32C) and female clips (26A)(26B)(26C). The purpose of this repair panel is access for repairs or part replacement.

There are two direct current (d/c) solenoids (11A)(11B) as the preferred means to cause motion, however, compressed air, hydraulics, or mechanical means can be utilized. Decorative covers (10A)(10B) cover the solenoids, however, their purpose is strictly cosmetic. The solenoids are attached to the top side of the casing, and secured by mounting plates (50A)(50B), wired in a series parallel and connected with male plugs (17A)(17B), female plugs (16A)(16B), that travel through the wire opening (14), under the wiper arm (22), exit at the wire mounting point (16A)(16B), and connected to a d/c power source provided by the vehicle (not pictured).

Connected to the solenoid push rods (34A)(34B) is a wedge plate (36A)(36B) constructed of any strong, suitable material, plastic as the preferred means.

The purpose of the wedge plate is to stop the downward direction of the insert blade (40) when the system is engaged. The casing has wedge strips (29A)(29B) to arrest the wedge plate. The wedge plate is guided by wedge plate guides (31A)(31B)(31C)(31D). Their purpose is to stop the scraper assembly from lateral movement.

Angle adjusters (38A)(38B) attached to the wedge plates are used to flex the insert blade (40) to match the windshield curvature. The angle adjusters and insert blade are the same as conventional type wiper blade inserts.

Attached to the bottom side of the blade insert (40) is a rubber buffer strip (44) used to make the coarse scraper (46) and fine scraper (48) have greater flexibility and an attachment point for the rubber blade (42). The fine and coarse scrapers are constructed of a material similar to scouring pads that won't scratch or score a windshield. The rubber blade is used to clear debris that may impair visibility when operating the system while driving.

From the description above, a number of advantages of the present invention become evident:

a) provide ease of application to existing windshield wiper assemblies.

b) minimum number of adjustments required for existing wiper assembly molds.

c) the simplicity of this invention provides for ease of production.

d) the Windshield Cleaning System can be made or painted any color to match existing decor.

e) all parts can have replacement parts made.

f) the system can be accessed easily.

g) the system can be connected to the windshield wiper mist control switch by a vehicle manufacturer or after market producer.

Operation—FIGS. 1, 2, 3, 4

The manner of using the Windshield Cleaning System is to connect the female plugs (16A)(16B) to a vehicle's mist control switch. When the user activates the mist control, the solenoids (11A)(11B) extend the insert blade (4) to the surface of the windshield allowing the scrapers (46)(48) to make contact. With the system engaged the standard rubber-type wiper blade (20) should just skim the surface of the windshield. Once the insect remains or debris are dislodged, the user should then release the mist control switch, causing the scraper to retract into the casing (12). The standard rubber wiper blade then clears away any remaining debris.

The Windshield Cleaning System is most effective when the wiper control speed is in the "fast" position. The rubber blade (42) located next to the scrapers (44)(46) allows the user to keep visibility while operating a vehicle.

Summary, Ramification, and Scope

Accordingly, the reader will see that the Windshield Cleaning System can be used inexpensively and conveniently to clean vehicle windshields.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Thus the scope of this invention should be determined by the appended claims and their legal equivalents, rather than by examples given.

I claim:

1. A windshield cleaning system for cleaning a surface of a vehicle, said cleaning system comprising;

an elongated wiping assembly including a wiper blade;

an elongated scraper assembly coupled with said wiping assembly for movement therewith over said surface;

said scraper assembly including;

an elongated casing having a pair of opposing wedge strips thereon and having a detachable repair panel thereon allowing access to said casing, a pair of longitudinally spaced attachment pieces extending laterally from said casing and coupled to said wiping assembly by fasteners, a scraping unit movably mounted in said casing for translational movement towards and away from said surface, said scraping unit including a pair of spaced angle adjusters, each having a wedge plate attached thereto, said adjusters supporting an elongated insert member, said insert member having a scraper member and rubber strip thereon, a pair of spaced solenoids are mounted on said casing and are coupled with said wedge plates by elongated push rods, said solenoids for coupling with a power source such that an activation of said solenoids drives said scraping member into an activated position of engagement with the surface being cleaned, in said position, the wedge plates are engaged with the wedge strips to prevent dislocation of the scraping unit from the casing.

* * * * *